United States Patent
Wang et al.

(10) Patent No.: US 11,686,624 B2
(45) Date of Patent: Jun. 27, 2023

(54) CHIP WIRING LAYER TEMPERATURE SENSING CIRCUIT, TEMPERATURE SENSING METHOD AND CHIP THEREOF

(71) Applicant: Zhejiang Johar Technology Co., Ltd., Hangzhou (CN)

(72) Inventors: Bo Wang, Hangzhou (CN); Hongfeng Zhu, Hangzhou (CN); Jian Liu, Hangzhou (CN); Jun Yi, Hangzhou (CN); Qibin Zhu, Hangzhou (CN)

(73) Assignee: ZHEJIANG JOHAR TECHNOLOGY CO., LTD., Hangzhou (CN)

( * ) Notice: Subject to any disclaimer, the term of this patent is extended or adjusted under 35 U.S.C. 154(b) by 414 days.

(21) Appl. No.: 16/927,438

(22) Filed: Jul. 13, 2020

(65) Prior Publication Data

US 2021/0072095 A1    Mar. 11, 2021

(30) Foreign Application Priority Data

Sep. 9, 2019   (CN) .......................... 201910848182.0

(51) Int. Cl.
*G01K 7/02*    (2021.01)
*G01K 7/14*    (2006.01)

(52) U.S. Cl.
CPC .............. *G01K 7/021* (2013.01); *G01K 7/14* (2013.01)

(58) Field of Classification Search
USPC ......................................................... 374/163
See application file for complete search history.

(56) References Cited

U.S. PATENT DOCUMENTS

| | | | |
|---|---|---|---|
| 6,463,396 B1* | 10/2002 | Nishigaki | G06F 21/81 702/132 |
| 2007/0005290 A1* | 1/2007 | Bueti | G01K 3/10 374/E3.007 |
| 2009/0059999 A1* | 3/2009 | Shoda | G01K 7/01 374/185 |
| 2014/0333271 A1* | 11/2014 | Kim | H02M 3/158 323/271 |
| 2021/0055166 A1* | 2/2021 | Wang | G01K 7/24 |

FOREIGN PATENT DOCUMENTS

CN            107505058 A   * 12/2017   ............... G01K 7/01

* cited by examiner

*Primary Examiner* — Mirellys Jagan
(74) *Attorney, Agent, or Firm* — Muncy, Geissler, Olds & Lowe, P.C.

(57) ABSTRACT

This invention discloses a chip wiring layer temperature sensing circuit, a temperature sensing method, a chip stereo temperature sensor, and a chip thereof. The chip wiring layer temperature sensing circuit includes a metal wiring layer temperature detection module, a pulse delay detection module, and a temperature transition module; wherein the metal wiring layer temperature detection module is disposed at a metal interconnection structure of a metal wiring layer of a chip; and the metal interconnection structure is electrically connected to the pulse delay detection module; wherein the pulse delay detection module includes a system high-speed clock, a delay data generated after a pulse passing through the metal wiring layer temperature detection module detected by the system high-speed clock, and the delay data was sent to the temperature transition module; wherein the temperature transition module calculates a temperature of the metal wiring layer according to the delay data.

11 Claims, 4 Drawing Sheets

CHIP WIRING LAYER TEMPERATURE SENSING CIRCUIT, TEMPERATURE SENSING METHOD AND CHIP THEREOF

CROSS-REFERENCE TO RELATED APPLICATIONS

This Non-provisional application claims priority under 35 U.S.C. § 119(a) on Chinese Patent Application No(s). 201910848182.0 filed on Sep. 9, 2019, the entire contents of which are hereby incorporated by reference.

BACKGROUND OF THE INVENTION

Field of the Invention

This invention relates to a technical field of temperature sensors in analog and digital-analog hybrid circuits, and more particularly, to a chip wiring layer temperature sensing circuit, a temperature sensing method, a chip stereo temperature sensor, and a chip thereof.

Description of the Related Art

With the development of on-chip computing, 5G technology and optical communication technologies, more and more components are integrated on a single chip, so the power consumption of the chip is large and more heat is generated per unit volume. Researchers have proposed various chip cooling methods to ensure the chip is stable in a normal temperature range. However, due to the limitation of the chip itself, the main source of the temperature signal of the heat dissipation is the substrate substrate temperature, which cannot reflect the actual temperature of the middle layer and the top routing metal of the chip. In practical applications, most of the heat sinks are arranged at the top of the chip or the bottom of the PCB, when the heat is really high, a nonlinear thermal gradient will be formed on the chip. When the heat is really high and the heat conduction is insufficient, the difference between the substrate temperature and the top temperature of the chip can be as high as sixty degrees. In high-speed applications, as the temperature of the routing metal increases, the signal transmission delay is greatly increase, resulting in an unrecoverable error result or a decrease in performance. In some low-speed applications, the temperature gradient of the structure being tested is also difficult to measure due to limitations such as installation.

BRIEF SUMMARY OF THE INVENTION

In order to overcome at least one deficiency of the prior art, this invention provides a chip wiring layer temperature sensing circuit, including: a metal wiring layer temperature detection module, a pulse delay detection module, and a temperature transition module; wherein the metal wiring layer temperature detection module is disposed at a metal interconnection structure of a metal wiring layer of a chip; and the metal interconnection structure is electrically connected to the pulse delay detection module; wherein the pulse delay detection module includes a system high-speed clock, a delay data generated after a pulse passing through the metal wiring layer temperature detection module detected by the system high-speed clock, and the delay data was sent to the temperature transition module; wherein the temperature transition module calculates a temperature of the metal wiring layer according to the delay data.

Optionally, the metal interconnection structures of the metal wiring layer temperature detection module may be located at the same metal wiring layer of the chip, and two ends of each metal interconnection structure may be electrically connected to a pulse delay detection module on a substrate by a conductive via.

Optionally, the chip wiring layer temperature sensing circuit further including: a digit buffer and an exclusive-or gate; wherein an input terminal of the digit buffer may be connected to a pulse input terminal, an output terminal of the digit buffer may be electrically connected to a first input terminal of the exclusive-or gate and a first terminal of the metal wiring layer temperature detection module respectively; a second terminal of the metal wiring layer temperature detection module may be electrically connected to a second input terminal of the exclusive-or gate, an output terminal of the exclusive-or gate may be connected to an input terminal of the system high-speed clock, and the delay data output from an output terminal of the system high-speed clock.

Optionally, the metal interconnection structure may have a hollow square or snakelike distribution.

Optionally, the metal interconnection structure may be a copper interconnection structure.

This invention also provides a chip wiring layer temperature sensing method using the above-mentioned chip wiring layer temperature sensing circuit, including: detecting the delay data generated after a pulse passing through the metal wiring layer temperature detection module; comparing the delay data with a reference delay data to obtain a current temperature corresponding to the metal wiring layer.

Optionally, the chip wiring layer temperature sensing method further may include: using the delay data obtained from the chip wiring layer temperature sensing circuit at a fixed predetermined temperature can be as the reference delay data.

This invention also provides a chip wiring layer temperature sensing circuit, including a plurality of metal wiring layer temperature detection modules, a plurality of pulse delay detection modules, and a temperature transition module, wherein each of the metal wiring layer temperature detection modules and each of the pulse delay detection modules are corresponding one by one, wherein each of the metal wiring layer temperature detection modules is a metal interconnection structure located at a metal wiring layer of a chip, the metal interconnection structure is electrically connected to each pulse delay detection module, and each of the metal wiring layer temperature detection modules is located at different metal interconnection layers of the chip; wherein each pulse delay detection module includes a system high-speed clock, using the system high-speed clock to detect a delay data generated after a pulse passing through the metal wiring layer temperature detection module, and send the delay data to the temperature transition module; wherein the temperature transition module calculates a temperature of the metal wiring layer of different layers according to the delay data.

This invention also provides a chip stereo temperature sensor, comprising a substrate temperature sensing module and the above-mentioned chip wiring layer temperature sensing circuit, the substrate temperature sensing module is electrically connected to the temperature transition module of the chip wiring layer temperature sensing circuit, a substrate temperature signal obtained by the substrate temperature sensing module can pass through the temperature transition module to calculate a substrate temperature.

This invention also provides a chip with the above-mentioned chip stereo temperature sensor.

The invention provides a chip wiring layer temperature sensing circuit, which can monitor a temperature change of a metal wiring layer by a metal interconnection structure, by designing a metal interconnection structure on a metal wiring layer of the chip. That is, the temperature of the metal wiring layer is calculated by using the delay data generated after the pulse through the metal interconnection structure. In the prior art, due to excessive temperature increase frequently, there is a nonlinear temperature gradient on the chip, and the signal transmission delay of the metal wiring is too large to affect the positioning. Therefore, compared with the defects in the prior art that only the chip substrate temperature can be measured and the middle or high-level metal wiring temperature of the chip cannot be controlled, this invention can locate the chip wiring layer temperature sensing circuit on any layer of the stereo structure of the chip, and the temperature change at a certain location can be detected according to the actual application requirements. At the same time, the invention also proposes designing metal interconnection structures at a plurality of metal wiring layers. That is, designing a metal wiring layer temperature detecting module in different metal interconnection layers of the chip, which can simultaneously monitor temperature changes at different positions of the chip, so as to grasp the temperature gradient brought by the temperature change of each layer inside the chip, and realize the temperature monitoring of each position of the chip, thereby providing temperature observation conditions for realizing better maintenance of the chip.

Figure 1:
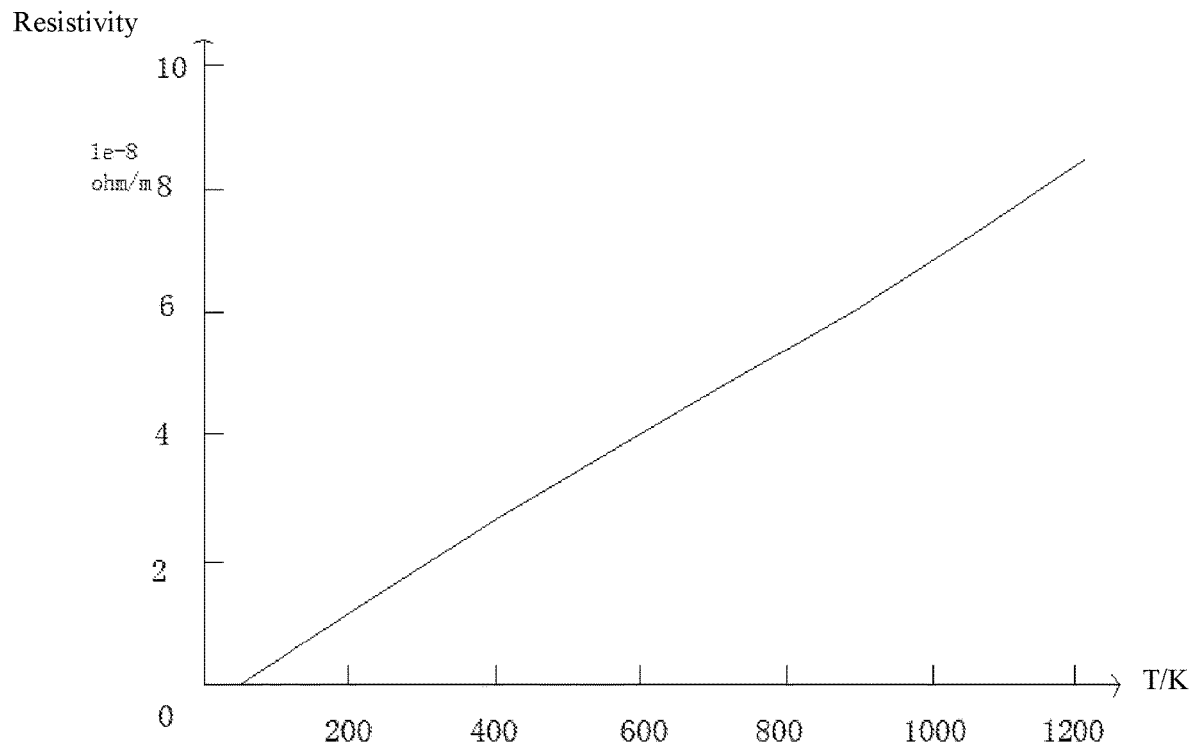
FIG. 1 is a schematic diagram showing a relationship between resistivity and temperature of copper designed by a single-chip stereo temperature sensor in this invention.

The reference numerals in the figure are as follows: 100—metal wiring layer temperature detection module; 200—pulse delay detection module; 300—temperature transition module; 400—substrate temperature sensing module; 500—conductive via.

DETAILED DESCRIPTION OF THE INVENTION

The technical solutions of the embodiments of the present invention will be clearly and completely described in the following with reference to the accompanying drawings. It is apparent that the described embodiments are part of the embodiments of the invention, and not all of the embodiments. All other embodiments obtained by those skilled in the art based on the described embodiments of the present invention without departing from the scope of the invention are within the scope of the invention.

The technical solutions in the embodiments of the present invention are clearly and completely described in the following with reference to the accompanying drawings in the embodiments of the present invention. It is obvious that the described embodiments are only a part of the embodiments of the present invention, but not all embodiments.

EMBODIMENT ONE

This invention discloses a chip wiring layer temperature sensing circuit in this embodiment as shown in FIG. 1 to FIG. 5. The chip wiring layer temperature sensing circuit includes a metal wiring layer temperature detection module 100, a pulse delay detection module 200, and a temperature transition module 300. The metal wiring layer temperature detection module 100 is disposed at a metal interconnection structure of a metal wiring layer of a chip. Meanwhile, the metal interconnection structure is electrically connected to the pulse delay detection module 200. The pulse delay detection module 200 includes a system high-speed clock, and a delay data generated after a pulse passing through the metal wiring layer temperature detection module 100 can be detected by the system high-speed clock. The temperature transition module 300 calculates a temperature of the metal wiring layer according to the delay data detected by the system high-speed clock.

Figure 2:
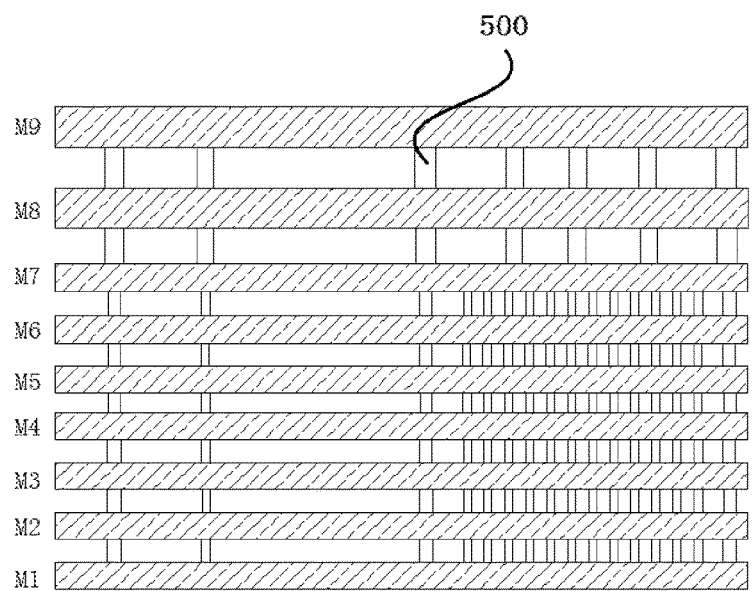
FIG. 2 is a schematic diagram showing a connection between various layers of metal on a chip by a conductive via in this invention.
Figure 3:
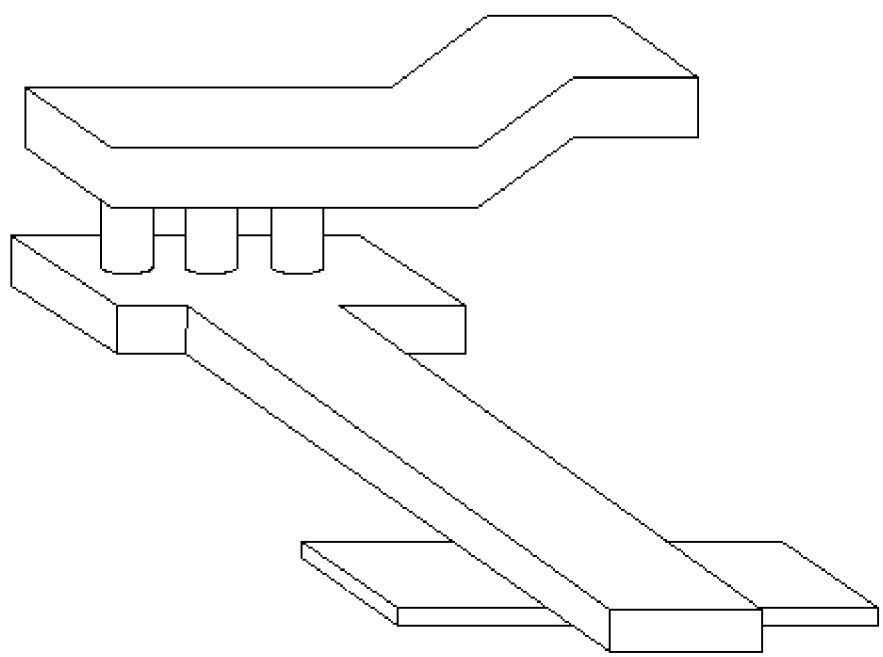
FIG. 3 is a schematic diagram showing a connection relationship between a wiring metal and a conductive via in this invention.

As shown in FIG. 1 to FIG. 4, the metal interconnection structures of the metal wiring layer temperature detection module 100 are located in the same metal wiring layer of the chip, and two ends of each metal interconnection structure are electrically connected to a pulse detecting module on a substrate by a conductive via 500. In the embodiment of FIG. 2, the metal wiring layers has a total of 9 layers, wherein the metal interconnection structure of the metal wiring layer temperature detection module 100 can be located at any layer of the metal wiring layers of the chip, for example, may be located at any layer of the first to the ninth layers. Specifically, when the metal interconnection structure of the metal wiring layer temperature detection module 100 is located at the first layer of the chip, it is used to detect a temperature of the corresponding metal wiring layer of the first layer; when the metal interconnection structure of the metal wiring layer temperature detection module 100 is located at the ninth layer of the chip, it is used to detect a temperature of the corresponding metal wiring layer of the ninth layer. By reasonable setting a position of the each metal interconnection structure (What layer is located at and which area is located at the chip), the temperature of the corresponding metal wiring layer during the working process of the chip can be selectively obtained.

Figure 6:
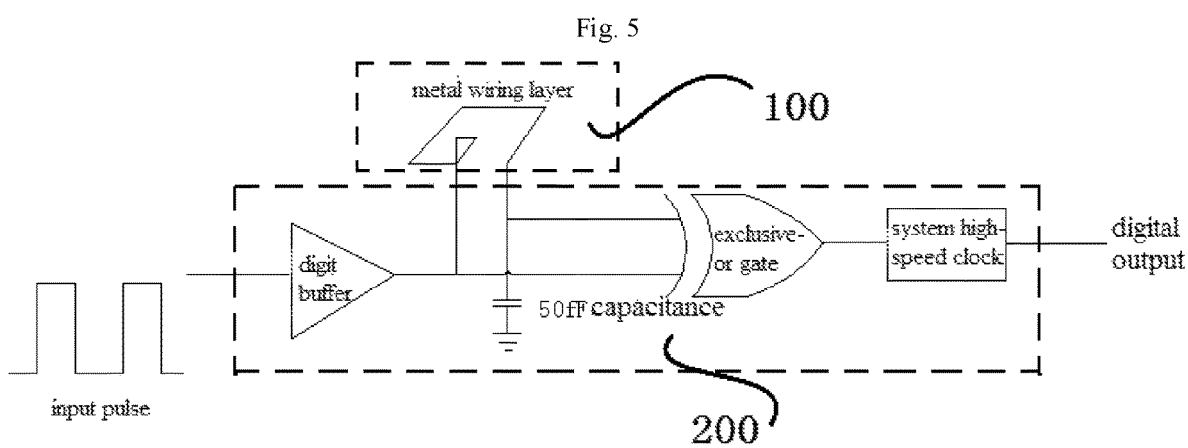
FIG. 6 is a schematic diagram of a connection relationship in a delay detecting circuit in this invention.

As shown in FIG. 6, the pulse delay detection module 200 of this invention further includes a digit buffer and an exclusive-or gate. An input terminal of the digit buffer is connected to a pulse input terminal, and an output terminal of the digit buffer is electrically connected to a first input terminal of the exclusive-or gate. Meanwhile, the digit buffer is electrically connected to a first terminal of the metal wiring layer temperature detection module 100. A second terminal of the metal wiring layer temperature detection module 100 is electrically connected to a second input terminal of the exclusive-or gate. Meanwhile, an output terminal of the exclusive-or gate is connected to an input terminal of the system high-speed clock and the delay data output from an output terminal of the system high-speed clock. Specifically, a schematic drawing of a delay detection circuit is shown in FIG. 6, when a low-speed pulse is input, the pulse passes through the digit buffer, goes to the input terminals of the exclusive OR gate together with the delay data detected by the metal wiring layer temperature detection module 100, and the delay data is obtained mainly caused by the temperature in the metal wiring layer after these two signals passing through the exclusive-or gate.

The delay data is converted into a digital signal and then output after passing through the system high-speed clock, and the digital signal is then calculated by the temperature transition module 300 to determine the temperature of the metal wiring layer. In this embodiment, the system high-speed clock is set at an internal circuit of the chip itself. In other embodiments, the system high-speed clock can be set independently outside the chip according to the actual circuit structure of the chip, and it is not limited to this embodiment.

In this embodiment, the metal interconnection structure is a copper interconnection structure and has a hollow square or snakelike distribution. This embodiment uses copper as the metal interconnection structure, mainly utilizing the copper can achieve higher normal temperature performance with lower resistance performance, compared with the traditional aluminum wiring material. The wiring materials used for manufacturing chips can be aluminum or copper. If aluminum is used as the wiring material, since aluminum has a large resistivity (about 2.8 micro ohms per micrometer), and even in the case of a slight change in the wiring size, it is possible to cause a large resistance variation with respect to the chip. Therefore, if copper is used as a wiring material, the small resistivity of copper (about 1.7 micro ohms per micron) is utilized, and the resistance of the metal wiring does not change greatly when the size of the fine wiring is changed, so that the metal wiring can achieve a higher normal temperature. Performance. In addition, since the temperature coefficient of copper is equivalent to that of aluminum, when the temperature changes, if the temperature rises, the performance of the chip using the metal wiring is deteriorated to the same extent. In the case of a slight change in the wiring size, the resistance of the metal wiring does not change greatly, so that the metal wiring can achieve a higher normal temperature performance. In addition, since the temperature coefficient of copper is equivalent to that of aluminum, when the temperature changes, such as the temperature is raised, the degree of deterioration of the performance of the chip using these two wiring metals is also equivalent.

As shown in FIG. 1, this figure is a diagram showing a relationship between a resistivity and a temperature of metal copper. It can be seen from the figure that at the normal temperature of the chip, that is, between 200K and 400K, the resistivity of copper increases linearly with increasing the temperature, and this temperature characteristic of copper makes it an excellent choice for temperature sensing devices. At the same time, since the resistivity of metallic copper fluctuates with temperature, it is difficult to directly detect the resistance. Therefore, when choosing a wiring length and a wiring cross-sectional area of the actual metal copper, it should be matched with the system high-speed clock. As in this embodiment, the high-speed clock used in this embodiment can distinguish a delay of 0.1 ns. Further, after the pulse passes the metal wiring layer temperature detection module 100, the temperature change per 1° C. of the metal copper can only generate a delay of 0.05 ns, so the system high-speed clock of the embodiment can distinguish the delay of 2° C. temperature change. In the practical application of this embodiment, the temperature sensitivity of the metal interconnection structure can be maintained in the range of 2° C. to 5° C.; that is, a wiring length and a wiring cross-sectional area of the metal copper are selected to meet the required conditions of temperature sensitivity, and copper wiring is appropriately extended. In other embodiments, reasonable metal copper wiring is selected based on the model requirements of the system high speed clock.

Figure 4:
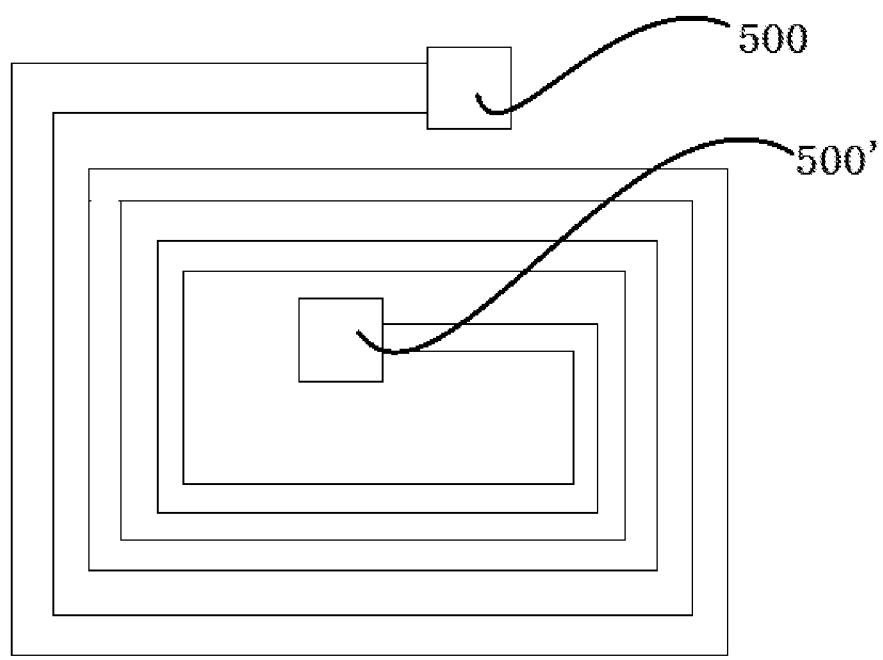
FIG. 4 is a schematic diagram of a metal wiring layer in a shape of a hollow square or snake-like in this invention.
Figure 5:
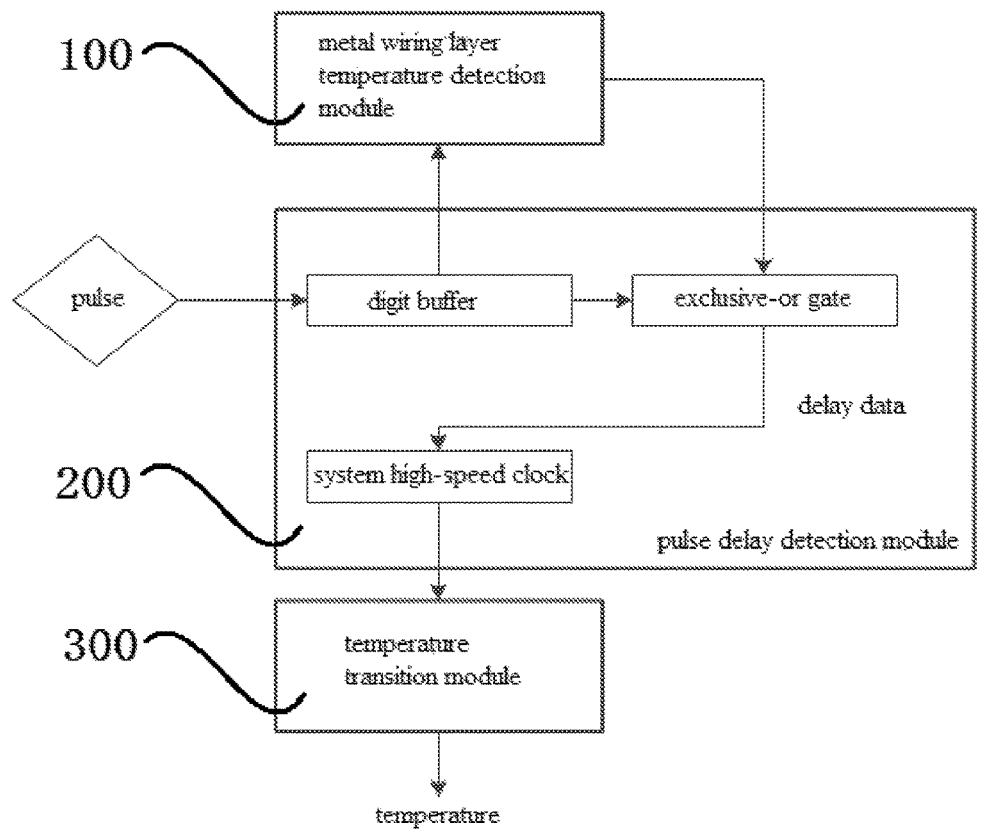
FIG. 5 is a schematic diagram of a connection between modules for reading a temperature of each metal wiring layer of a chip in this invention.

The metal interconnection structure in this embodiment has a hollow square or snakelike distribution, as shown in FIG. 4. This wiring method can realize an increase of the resistance value of the metal wiring by increasing the length of the metal wiring in one unit area, thereby increasing a sensitivity of sensing the temperature. Therefore, the present invention uses copper as the metal interconnection structure to effectively improve the performance of the metal wiring layer temperature detection module 100 in one metal wiring layer. Furthermore, two terminals of the metal interconnection structure are also electrically connected to the pulse detecting module on the substrate through by the conductive via 500, a circuit data can be directly read by the electrical connection, and it can be prevented from being affected by other layers or other circuit structures on the chip.

At the same time, since the accuracy and resolution requirements of the stereo temperature distribution of the chip are generally low, such as between −5° C. and +5° C., a counting clock frequency used by the system high-speed clock can be selected according to actual needs during design.

EMBODIMENT TWO

The invention also discloses a chip wiring layer temperature sensing method designed by using a circuit structure of a chip wiring layer temperature sensing circuit of the embodiment one. The chip wiring layer temperature sensing method of the embodiment mainly includes the following steps Step S1: detecting the delay data generated after a pulse passing through the metal wiring layer temperature detection module 100. As introduced in embodiment one, that is, the metal wiring structure is provided at the metal wiring layer, and the metal interconnection structure is the metal wiring layer temperature detection module 100. Therefore, after the pulse is input to the metal wiring layer, the metal wiring layer temperature detection module 100 detects the pulse. After the pulse detection is completed, the metal wiring layer temperature detection module 100 generates and outputs a delay data, and then only output a delay data caused mainly by the temperature change in the metal wiring layer after the delay data and the original input pulse selected by the exclusive-or gate inside the pulse delay detection module 200. The delay data at this time is again converted into a digital data and output by the system high-speed clock in the pulse delay detection module 200.

Step S2: Compare the delay data with a reference delay data to obtain a current temperature corresponding to the metal wiring layer. The delay data generated by the step S1 that has been converted into a digital signal output then enters the temperature transition module 300. The delay data at the temperature transition module 300 will be compared with the reference delay data, and the current temperature corresponding to the metal wiring layer can be obtained by a calculation.

Due to an inevitable self-factors of the chip such as manufacturing variations and parasitic effects, a reference pulse width of each layer of metal at normal temperature is inconsistent in a single chip or between chips, so a simple calibration is required. During the calibration, the chip needs to be in a low power working mode to generate a large temperature field, that is, the delay data of the temperature sensing circuit of the chip wiring layer needs to be obtained by the system high-speed clock at a fixed predetermined temperature, the delay data can be used as the reference delay data.

EMBODIMENT THREE

In most cases, different temperature detections of the metal wiring layer is performed on the chip. Therefore, this invention further discloses a chip wiring layer temperature sensing circuit, and the chip wiring layer temperature sensing circuit includes a plurality of metal wiring layer temperature detection modules 100, a plurality of pulse delay detection module 200, and the temperature transition module 300. Each of the metal wiring layer temperature detection modules 100 and each of the pulse delay detection modules 200 are corresponding one by one. The metal wiring layer temperature detection modules 100 are the metal interconnection structure located at the metal wiring layer of the chip, the metal interconnection structure is electrically connected to each pulse delay detection module 200, and each of the metal wiring layer temperature detection modules 100 is located at different metal interconnection layers of the chip. Each pulse delay detection module 200 includes a system high-speed clock. Using the system high-speed clock to detect the delay data generated after the pulse passing through the metal wiring layer temperature detection module 100, and send the delay data to the temperature transition module 300. According to the delay data, the temperature transition module 300 calculates the temperature of the metal wiring layer of different layers. The metal layers of the chip are connected by the conductive via 500 as shown in FIG. 2. Since the size of the conductive through-hole 500 is relatively small compared with the size of the metal wiring, the resistance change caused by the resistance of the conductive viva hole 500 can be ignored when the metal wiring is used as the temperature sensing. Therefore, making a plurality of metal wiring layer temperature detection modules 100 with meatal of different layers, to realize the stereo temperature sensing of the chip. However, as described in the embodiment one, the resistivity of copper is relatively low, and under the limited area and temperature gradient, the resistance change difference between adjacent metals is relatively small, and the difference is difficult to distinguish. Therefore, in this embodiment, preferred choose an interlayer metal to make the metal wiring layer temperature detection module 100. For example, when there are 9 layers of metal, the metal wiring layer temperature detection module 100 is preferred to be disposed at the 9-7-5-3 layers of metal. However, in other embodiments, it is not limited to the number of layers in the embodiment. According to the performance characteristics of the actual circuit and the requirements for chip temperature detection, the number of the metal layers of the metal wiring layer temperature detection module 100 can be selected.

In addition, in order to save power consumption, the temperature detection of the stereo metal wiring layer can only be carried out by the temperature detection of the metal wiring layer by the metal wiring layer temperature detection module 100 when a substrate temperature is greater than 50 degrees. The input terminal of the pulse delay detection module 200 and the exclusive OR gate are designed with a low voltage, and a standard metal capacitor is added to increase the length of the input pulse, further reducing the counter requirements.

EMBODIMENT FOUR

Figure 7:
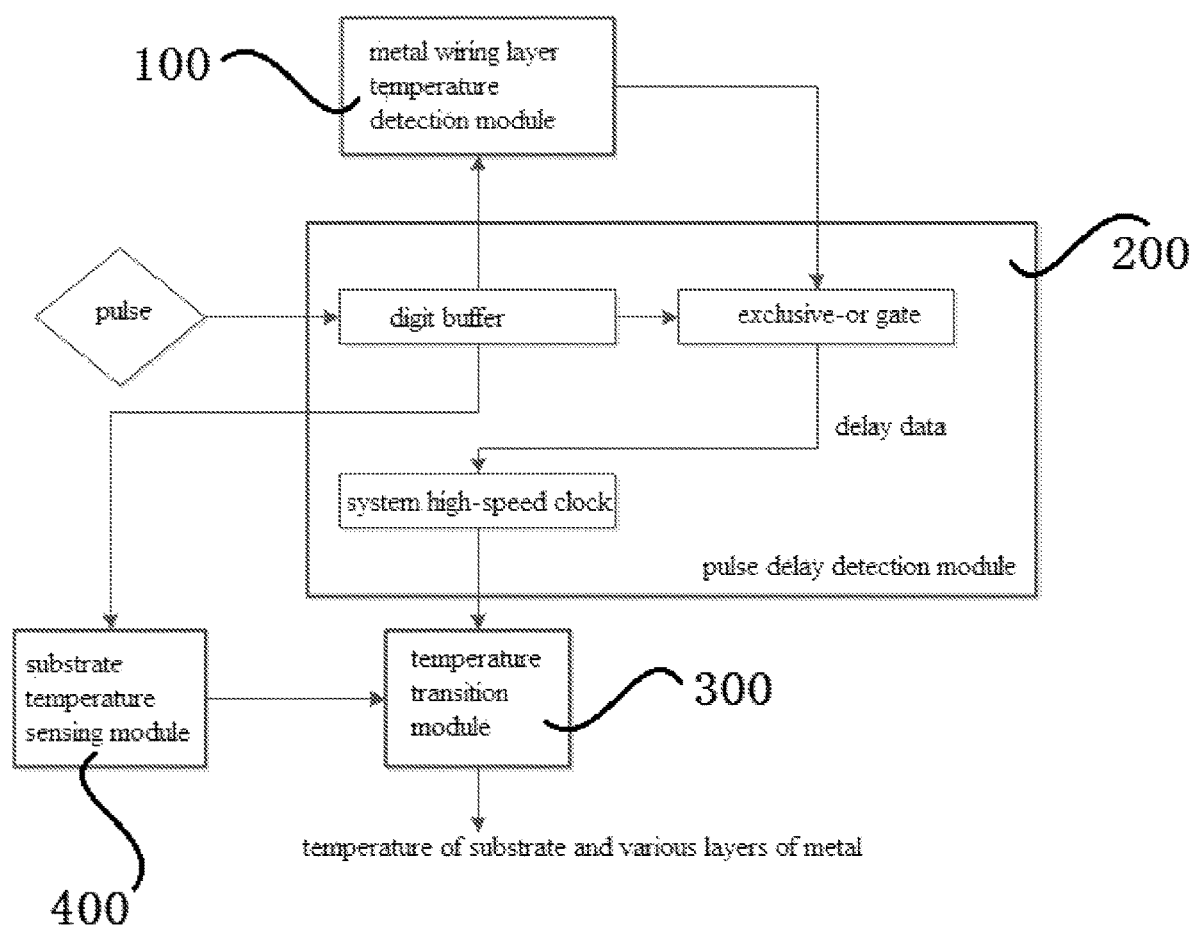
FIG. 7 is a schematic diagram of a connection between modules for reading a temperature of each metal wiring layer and a substrate temperature of a chip in this invention.

As shown in FIG. 7, this invention also discloses a chip stereo temperature sensor. The sensor includes a substrate temperature sensing module 400 and a chip wiring layer temperature sensing circuit described in embodiment three. Meanwhile, the chip wiring layer temperature sensing circuit disclosed in embodiment three is a chip wiring layer temperature sensing circuit designed to implement temperature monitoring of a plurality of metal wiring layers based on embodiment one, so the specific chip wiring layer temperature sensing circuit can refer to embodiment one and embodiment two.

Specifically, the substrate temperature sensing module 400 is electrically connected to the temperature transition module 300 of the chip wiring layer temperature sensing circuit. Therefore, a substrate temperature signal obtained by the substrate temperature sensing module 400 can pass through the temperature transition module 300 to calculate a substrate temperature.

At the same time, this embodiment also uses the chip wiring layer temperature sensing method in embodiment two to perform a normal working state of the chip stereo temperature sensor. In this embodiment, the substrate temperature sensing module is a temperature sensing transistor or a MOS transistor. Therefore, the chip stereo temperature sensor disclosed in this embodiment can simultaneously realize temperature monitoring of any one of the metal wiring layers in the substrate and the chip stereo structure of the chip.

EMBODIMENT FIVE

This invention also discloses a chip using the chip stereo temperature sensor in embodiment four. Use the chip stereo temperature sensor designed inside the chip, and utilize a characteristics of the chip stereo temperature sensor can simultaneously monitor the substrate temperature and the temperature of any metal wiring layer of the stereo chip, so as to to realize the full temperature detection inside the chip.

It should be noted that the above embodiments are only used to illustrate the technical solutions of the present invention, and are not limited thereto. Although the present invention has been described in detail with reference to the foregoing embodiments, those skilled in the art should understand that the technical solutions described in the foregoing embodiments are modified, or some of the technical features are equivalently replaced; and the modifications or substitutions do not deviate from the scope of the technical solutions of the embodiments of the present invention.

In summary, the above description is only the preferred embodiment of the present invention, and all changes and modifications made by the scope of the present invention should be covered by the present invention.

What is claimed is:

1. A chip wiring layer temperature sensing circuit, comprising: a metal wiring layer temperature detection module, a pulse delay detection module, and a temperature transition module;

wherein the metal wiring layer temperature detection module is disposed at a metal interconnection structure located at a metal wiring layer of a chip; and the metal interconnection structure is electrically connected to the pulse delay detection module;

wherein the pulse delay detection module comprises a system high-speed clock, delay data generated after a pulse passes through the metal wiring layer temperature detection module is detected by the system high-speed clock, and then the delay data is sent to the temperature transition module; and wherein the temperature transition module calculates a temperature of the metal wiring layer according to the delay data.

2. The chip wiring layer temperature sensing circuit according to claim 1, wherein the metal interconnection structure is located at the same metal wiring layer of the chip, and two ends of the metal interconnection structure are electrically connected to the pulse delay detection module on a substrate by a conductive via.

3. The chip wiring layer temperature sensing circuit according to claim 1, further comprising: a digit buffer and an exclusive-or gate; wherein an input terminal of the digit buffer is connected to a pulse input terminal; an output terminal of the digit buffer is electrically connected to a first input terminal of the exclusive-or gate and a first terminal of the metal wiring layer temperature detection module respectively; a second terminal of the metal wiring layer temperature detection module is electrically connected to a second input terminal of the exclusive-or gate; an output terminal of the exclusive-or gate is connected to an input terminal of the system high-speed clock; and the delay data is output from an output terminal of the system high-speed clock.

4. The chip wiring layer temperature sensing circuit according to claim 1, wherein the metal interconnection structure has a hollow square or snakelike distribution.

5. The chip wiring layer temperature sensing circuit according to claim 1, wherein the metal interconnection structure is a copper interconnection structure.

6. A chip wiring layer temperature sensing method using the chip wiring layer temperature sensing circuit according to claim 1, comprising:

detecting the delay data generated after a pulse passes through the metal wiring layer temperature detection module; and comparing the delay data with a reference delay data to obtain the temperature corresponding to the metal wiring layer.

7. The chip wiring layer temperature sensing method according to claim 6, further comprising: using the delay data obtained from the chip wiring layer temperature sensing circuit at a fixed predetermined temperature as the reference delay data.

8. A chip stereo temperature sensor, comprising a substrate temperature sensing module and the chip wiring layer temperature sensing circuit according to claim 1, the substrate temperature sensing module being electrically connected to the temperature transition module of the chip wiring layer temperature sensing circuit, wherein a substrate temperature signal obtained by the substrate temperature sensing module can pass to the temperature transition module to calculate a substrate temperature.

9. A chip with the chip stereo temperature sensor according to claim 8.

10. A chip wiring layer temperature sensing circuit, comprising a plurality of metal wiring layer temperature detection modules, a plurality of pulse delay detection modules, and a temperature transition module, wherein each of the metal wiring layer temperature detection modules and each of the pulse delay detection modules are corresponding one by one, wherein each of the metal wiring layer temperature detection modules is disposed at a metal interconnection structure located at a metal wiring layer of a chip, the metal interconnection structure is electrically connected to each pulse delay detection module, and each of the metal wiring layer temperature detection modules is located at different metal interconnection layers of the chip;

wherein each pulse delay detection module comprises a system high-speed clock, wherein the system high-speed clock detects delay data generated after a pulse passes through the metal wiring layer temperature detection module, and sends the delay data to the temperature transition module; and wherein the temperature transition module calculates a temperature of the metal wiring layer of different metal interconnection layers according to the delay data.

11. A chip stereo temperature sensor, comprising a substrate temperature sensing module and the chip wiring layer temperature sensing circuit according to claim 10, wherein the substrate temperature sensing module is electrically connected to the temperature transition module of the chip wiring layer temperature sensing circuit, and a substrate temperature signal obtained by the substrate temperature sensing module can pass to the temperature transition module to calculate a substrate temperature.

* * * * *